Dec. 1, 1959 V. F. CARTWRIGHT 2,915,700
TEST APPARATUS FOR MEASURING TIME DELAYS
Filed Oct. 17, 1955 2 Sheets-Sheet 2

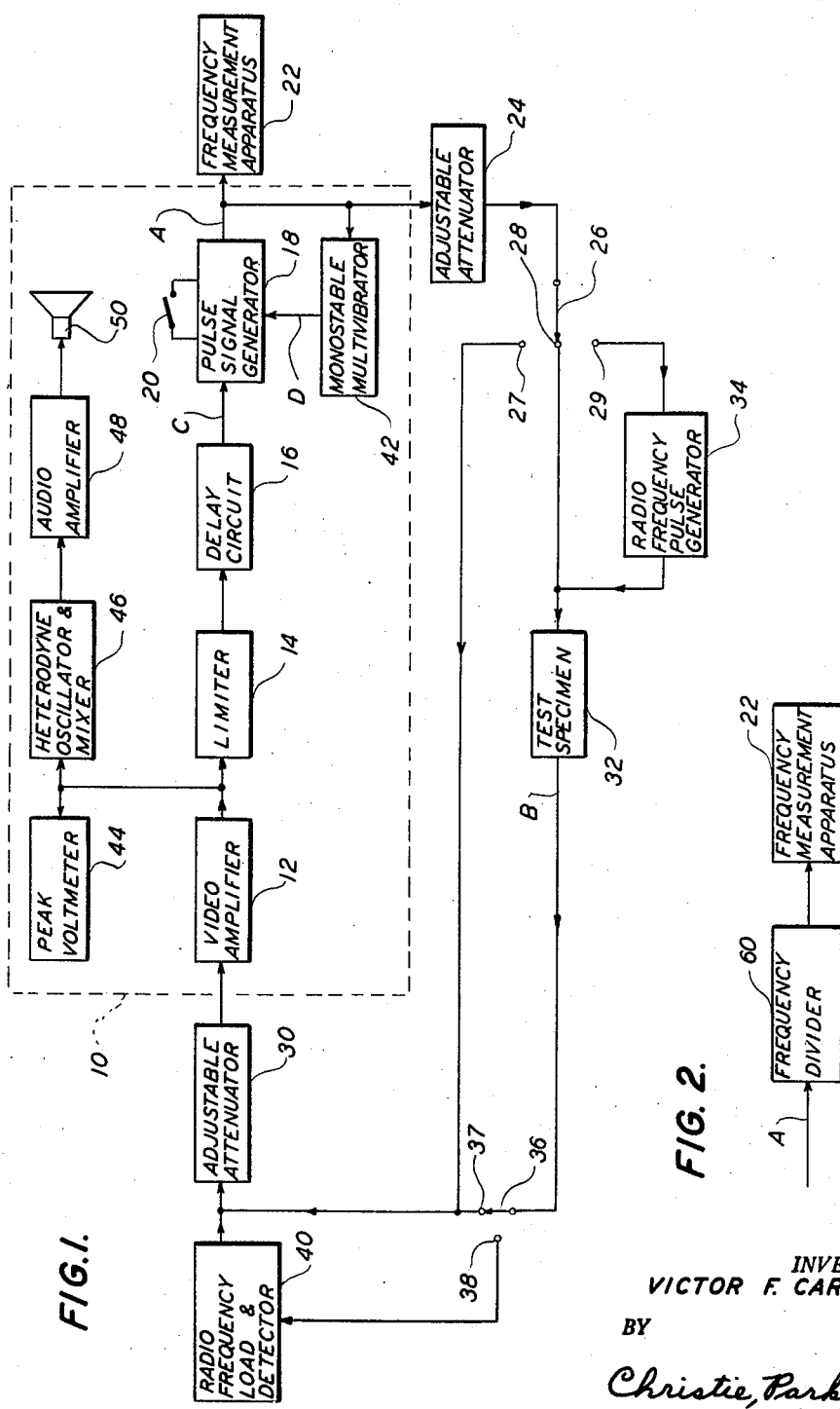

INVENTOR.
VICTOR F. CARTWRIGHT
BY
Christie, Parker & Hale
ATTORNEYS

United States Patent Office 2,915,700
Patented Dec. 1, 1959

2,915,700

TEST APPARATUS FOR MEASURING TIME DELAYS

Victor F. Cartwright, Pasadena, Calif.

Application October 17, 1955, Serial No. 540,835

14 Claims. (Cl. 324—57)

This invention relates to improved apparatus for measuring the time delay and for measuring variations in the time delay of an electric signal through various types of electrical circuits.

It is desirable to ascertain the time delay of an electric signal through many types of electrical circuits. By way of example, measurement of such time delays is desirable for many lumped constant circuits, delay lines, video amplifiers, limiters, radio frequency band-pass circuits, radio frequency amplifiers, and radio receivers. The measurement of the time delay through such an electrical circuit may be for the purpose of ascertaining the total delay which is introduced by the circuit, or for the purpose of ascertaining the effect of certain variables upon the operation of the circuit. For example, it may be desirable to ascertain variations in the time delay which are caused by temperature variations, shock and vibration, the size of moisture and protective coating materials, electrode potential changes, variations in the amplitude of input signals, variations in the frequency of input signals, variations in the atmospheric pressure, and the effects of detuning stages of a multi-stage circuit.

Heretofore, complex arrangements have been employed to make such measurements. As a result, the measurements are difficult to obtain, and the measurements are ordinarily limited to measurement of the delay through an entire system, since it would require considerable time and effort to measure the time delay of the signal through the individual components of the system.

These difficulties are overcome in the present invention by providing a simple arrangement for measuring the time delay of an electrical signal through component circuits or through systems. In accordance with the present invention, signal generating means is provided for producing a pulse output signal in response to an input signal, and the signals which are produced by the signal generator are applied through the specimen to be tested to the input of the signal generating means so as to cause the signal generating means to produce pulse signals having a repetition frequency which is governed by the time delay introduced by the specimen. Measurement of the repetition frequency of the signal which is produced by the signal generator provides a measure of the time delay introduced by the specimen.

The pulse signals may be unidirectional signals for testing components such as video amplifiers and the like, or they may be radio frequency pulse signals for testing components such as radio frequency amplifiers and the like. If desired, the rise time of the pulse signals may be adjusted so as to effect measurement over a wide frequency spectrum.

Thus, the apparatus of the present invention may be employed in testing many types of electrical circuits, the apparatus is easy to operate since it merely requires a frequency measurement, and the apparatus is extremely precise since the frequency measurements can be made with great precision. By way of example, it is easy to make measurements having an accuracy of plus or minus .001 microsecond.

The invention is explained in detail with reference to the drawings, in which:

Fig. 1 is a block diagram illustrating a preferred embodiment of the invention;

Fig. 2 illustrates a modification of the apparatus for providing more precise frequency measurements;

Figure 3:
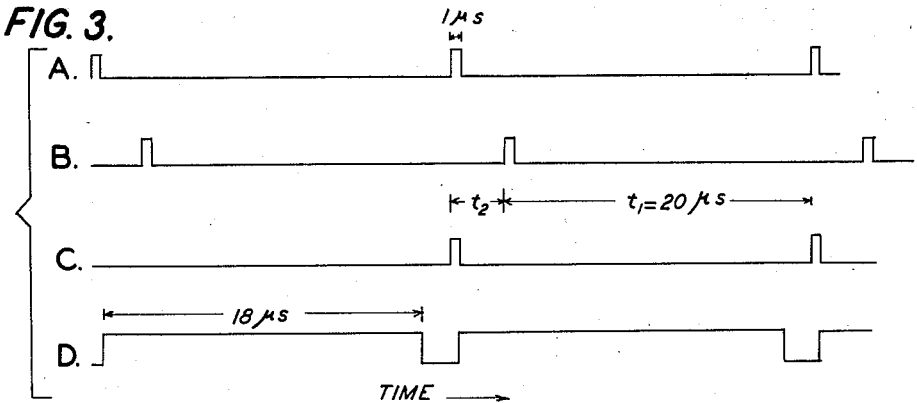
Figure 4:
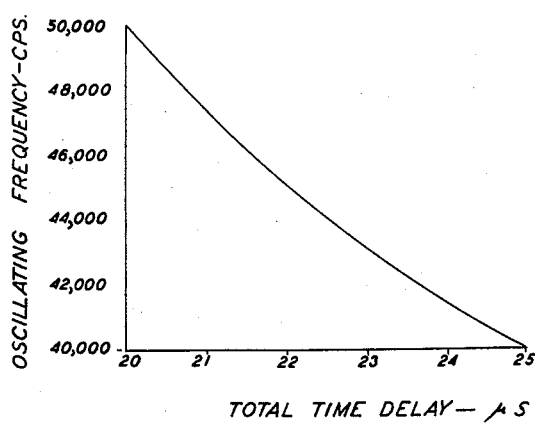

Fig. 3 shows the wave forms of various signals which are produced in the circuits of the apparatus of Fig. 1, and the letters which are employed to designate the wave forms are also employed to designate the location in the apparatus of Fig. 1 where the signals occur; and Fig. 4 is a curve showing how the oscillating frequency of the apparatus of Fig. 1 varies with changes in the total time delay of the signal through the apparatus.

The measurement apparatus of the invention may be provided as a single unit to which the test specimen is coupled in order to make the desired measurements. In the alternative, the test apparatus of the invention may be in the form of a basic unit which may be coupled to auxiliary equipment which is ordinarily available in most laboratories. Such a basic unit is designated by the numeral 10 in the apparatus of Fig. 1. The basic unit comprises a video amplifier 12, a limiter 14, a delay circuit 16, and a pulse signal generator 18.

Preferably the video amplifier, the limiter, and the delay circuit are wide-band types. Also, it is preferable that the amplifier have an even number of stages so that the output of the amplifier is in phase with its input. The limiter provides an output signal which is independent of noise or other variations in the signal which is applied to its input and the limiter serves to increase the stability of operation of the test apparatus. The pulse signal generator 18 may be a blocking oscillator or a mutivibrator arranged to produce an output pulse in response to each pulse signal which is applied to its input circuit. If desired, the pulse signal generator may be arranged to provide pulse signals of adjustable width so as to permit measurement of the time delay of pulses of various widths through the test specimen. Also, the pulse signal generator, or an auxiliary circuit coupled to its output circuit may be arranged to vary the rise time of the individual pulses so as to permit measurements to be made over a wide frequency spectrum.

A switch 20 may be provided for causing the pulse signal generator to produce the first pulse, and thereafter the successive pulses are produced in response to the signals which are applied through the test apparatus to the input of the pulse signal generator.

Frequency measurement apparatus 22 is coupled to the output of the pulse signal generator for measuring the repetition frequency of the signals which are produced by the pulse signal generator.

In the test setup which is illustrated in Fig. 1, the output of the basic unit 10 is applied through an adjustable attenuator 24 to a switch 26. The switch has contacts 27, 28 and 29 for providing connections to various parts of the circuit. The switch contact 27 is connected to an adjustable attenuator 30 which in turn is connected to the input of the video amplifier 12. The switch contact 28 is connected to the input of a test specimen 32, and the output of the test specimen may be coupled to the input of the adjustable attenuator 30. The switch contact 29 is connected to a radio frequency pulse generator 34, and the output of the radio frequency pulse generator is connected to the input of the test specimen. A switch 36 is provided for connecting the output of the test specimen through a switch contact 37 to the adjustable attenuator 30 or through the switch contact 38 to a radio frequency load and detector 40. The output of the radio frequency load and detector is coupled to the adjustable attenuator 30.

Preferably the entire pulse system should be of the wide-band variety so that the pulses will rise and decay rapidly and so that the lowest frequency component of the pulse (i.e. the oscillating frequency), will not be altered in time by the oscillating frequency. Since a wide-band system is prone to harmonic oscillations, it is desirable to prevent undesired or spurious operation of the pulse signal generator. I prefer to do this by employing a monostable multivibrator 42 to control the action of the pulse signal generator. The monostable multivibrator 42 is responsive to the pulses which are produced by the pulse signal generator 18 and it disables the pulse signal generator for a predetermined time after each output signal is produced so as to prevent spurious operation of the pulse signal generator. Preferably, the monostable multivibrator disables the pulse signal generator after each output pulse is produced for a time which is slightly less than the time delay of the delay circuit 16. This disabling action may be effected by a conventional gating arrangement which serves to gate the pulse signal generator on and off at the desired times.

It will be apparent that other arrangements may be employed for preventing spurious operation of the pulse signal generator. For example, the measurement apparatus may be disabled by use of a gate at other locations in the circuit to prevent the apparatus from conveying a pulse for a predetermined time after each output pulse is produced by the pulse signal generator.

If desired, a peak voltmeter 44 may be employed either at the output or at the input of the video amplifier 12 for measuring the amplitude of the pulse signals which are employed to trigger the pulse signal generator 18. Ordinarily it is desirable to maintain the triggering signals at substantially constant amplitude.

Also, an audio signal may be produced so as to provide a rough indication of the delay produced by the test specimen. Such an arrangement is illustrated in Fig. 1 wherein a heterodyne oscillator and mixer 46 is coupled to the output of the video amplifier. The output of the heterodyne oscillator and mixer is applied through an amplifier 48 to a loud speaker 50.

The measurement apparatus may be termed a delay control oscillator. The frequency of the oscillations may be expressed as follows:

$$F = \frac{1}{t_1 + t_2}$$

where $t_1$ equals the delay of all of the circuitry except the test specimen and $t_2$ is the delay introduced by the test specimen.

The amount of frequency change may be found by differentiating the above equation, which gives the following result:

$$\frac{-1}{(t_1 + t_2)^2}$$

By way of example, if $t_1 + t_2$ equals 20 microseconds, the oscillating frequency will be 50,000 c.p.s., and this frequency will vary 2.5 c.p.s. per .001 microsecond change in delay. A typical curve for such operation is illustrated in Fig. 4.

In operation, the switch 26 may be connected to the terminal 27 to ascertain the oscillating frequency of the circuit without the test specimen. The switch 20 is actuated to cause the pulse signal generator to produce a first pulse, and this pulse is applied through the adjustable attenuator 24, the switch terminal 27, the adjustable attenuator 30, the video amplifier 12, the limiter 14, and the delay circuit 16 to the input of the pulse signal generator. The pulse signal generator produces an output pulse in response to each input pulse, and hence the oscillating or repetition frequency for this condition of operation is determined by the time delay which is introduced by the delay circuit 16 plus any other time delays which may be inherent in the circuit.

In order to measure the time delay which is introduced by the test specimen 32, the switch 26 is connected to the terminal 28, and the switch 36 is connected to the terminal 37. The wave forms of Fig. 3 illustrate typical signals which may be generated in various parts of the circuit of Fig. 1 for this condition of operation. The first pulse of the wave forms A is produced by actuating switch 20 and thereafter the pulse signal generator produces the pulses in response to the signals C which are applied to its input circuit. The pulses A are applied through the test specimen 32 to provide pulses B and its output circuit which are delayed a time $t_2$ by the time delay which is introduced by the test specimen. In the arrangement illustrated, the time delay which is caused by the delay circuit 16 and the remainder of the circuit other than the test specimen is 20 microseconds, and the pulses C which are applied to the input of the pulse signal generator are delayed 20 microseconds with respect to the pulses B which are produced at the output of the test specimen. The monostable multivibrator 42 provides a control signal D which disables the pulse signal generator 18 for 18 microseconds after each pulse so as to prevent spurious operation of the pulse signal generator.

Thus, the periodicity or repetition rate of the pulses which are produced by the pulse signal generator 18 is determined by the sum of the time delays $t_1$ and $t_2$ produced by the delay circuit and the test specimen.

In the example illustrated in the drawings, the oscillating frequency is 50,000 c.p.s. when the switch 26 is connected to the contact 27, and the oscillating frequency is somewhat less with the switch 26 connected to the contact 28. By measuring the oscillating frequency for both conditions, the time delay introduced by the test specimen 32, may be ascertained by a direct indicating scale on the frequency measurement apparatus, by calculation, or by the use of the chart of Fig. 4.

If a radio frequency signal is to be conveyed through the test specimen, the switch 26 is connected to the contact 29 so that the pulses which are produced by the pulse signal generator 18 actuate the radio frequency pulse generator 34. The switch 36 is connected to the contact 38 so that the radio frequency pulses which are conveyed through the test specimen 32 are applied to the radio frequency load and detector 40. The radio frequency load and detector serves to produce unidirectional pulse signals which are applied to the adjustable attenuator 30 so that they will trigger the pulse signal generator 18.

Various types of frequency measuring apparatus may be employed. A conventional device for providing an indication of frequency or for providing an indication of events per unit of time may be employed. Also, a frequency discriminator may be employed to drive a calibrated recorder so as to provide a continuous record of time delays over a period of time.

Since the interval of one oscillating cycle is determined by $t_1 + t_2$, if we divide the frequency by a fixed number (N) the result of the divided or counted-down interval is $Nt_1 + Nt_2$ and therefore $t_2$ is effectively multiplied by the division factor N. Thus, if $t_2$ varies .001 microsecond and the frequency is divided by 100, the divided interval changes .001 times 100 microsecond, which is equal to 0.1 microsecond. This effect is equivalent to magnifying the delay $t_2$ by a factor of 100.

Fig. 2 illustrates an arrangement for providing such magnification. In this arrangement, the output signals A which are produced by the pulse signal generator 18 are applied to a frequency divider 60 which produces a divided version of the signal at its output circuit. This divided signal may be applied to various types of frequency measurement apparatus such as an oscilloscope or a pulse-width type discriminator.

It will be apparent that the delay circuit 16 may be omitted if the test specimen 32 provides a time delay which is sufficient to bring the oscillating frequency within measurable limits.

Also, it will be apparent that the serially-connected elements in the oscillating circuit may be rearranged to some extent. By way of example, the location of the delay circuit and the test specimen may be exchanged if desired.

The radio frequency generator 34 may provide radio frequency pulse, amplitude-modulated signals, or frequency-modulated signals, as required for the particular specimen to be tested.

I claim:

1. In apparatus for measuring the time delay of a signal through a specimen, signal generating means for producing a discrete output signal in response to an input signal, means for applying the output signals of the signal generating means through the specimen to be tested to the input of the signal generating means to cause the signal generating means to produce signals having a repetition frequency which is governed by the time delay introduced by the specimen, means coupled to the output of the pulse generating means for disabling the measurement apparatus for a predetermined time after each output signal is produced to prevent spurious operation of the signal generating means, and means coupled to the output of the signal generating means for measuring the repetition frequency of the signals produced by the signal generating means to provide a measure of the time delay caused by the specimen.

2. In apparatus for measuring the time delay of a signal through a specimen, signal generating means for producing an output signal in response to an input signal, a delay circuit for delaying an input signal a fixed time, means for applying the output signals of the signal generating means through the specimen to be tested and through the delay circuit to the input of the signal generating means to cause the signal generating means to produce signals having a frequency which is governed by the sum of the time delays produced by the delay circuit and the test specimen, and means coupled to the output of the pulse generating means for disabling the signal generating means after each output signal is produced for a period of time which is slightly less than the time delay of the delay circuit to prevent spurious operation of the signal generating means.

3. Measurement apparatus comprising signal generating means for producing a pulse signal in response to an input signal, a test specimen and a delay circuit coupled in series between the output of the signal generating means and the input of the signal generating means for causing the signal generating means to produce pulse signals having a repetition frequency which is governed by the sum of the time delays caused by the delay circuit and the test specimen, the time duration of the respective pulse signals being a small fraction of the time delays caused by the delay circuit and the test specimen, means coupled to the output of the signal generating means for disabling the measurement apparatus for a predetermined time after each output signal is produced to prevent spurious operation of the signal generating means, and means responsive to the pulses generated by said signal generating means for measuring the repetition frequency of the signals produced by the signal generating means to provide a measure of the time delay caused by the test specimen.

4. The apparatus of claim 3 wherein the signal generating means is a pulse generator which produces unidirectional pulses.

5. The apparatus of claim 3 wherein the signal generating means includes a radio frequency signal generator for producing radio frequency pulse signals.

6. The apparatus of claim 3 wherein the means for disabling the measurement apparatus is a monostable multivibrator responsive to the pulse signals produced by the signal generating means and having its output coupled to the signal generating means for disabling the signal generating means after each output signal is produced for a period of time which is slightly less than the time delay of the delay circuit.

7. The apparatus of claim 3 wherein the means for measuring the repetition frequency of the signals produced by the signal generating means includes a frequency divider for enhancing the accuracy of the measurement.

8. Time-delay measurement apparatus comprising a video amplifier having an input circuit for receiving pulse signals, a limiter coupled to the output of the video amplifier, a pulse signal generator coupled to the output of the limiter for producing a pulse signal at its output circuit in response to an input signal, so that a test specimen may be coupled between the output circuit of the pulse signal generator and the input circuit of the video amplifier to cause the pulse signal generator to produce signals having a repetition frequency which is governed by the time delay caused by the test specimen, and means coupled to the output of the signal generator for disabling the measurement apparatus for a predetermined time after each output signal is produced by the pulse signal generator to prevent spurious operation of the pulse signal generator.

9. Time-delay measurement apparatus comprising a video amplifier having an input circuit for receiving pulse signals, a limiter coupled to the output of the video amplifier, a delay circuit coupled to the output of the limiter, a pulse signal generator coupled to the output of the delay circuit for producing a pulse signal at its output circuit in response to an input signal, so that a test specimen may be coupled between the output circuit of the pulse signal generator and the input circuit of the video amplifier to cause the pulse signal generator to produce signals having a repetition freqency which is governed by the sum of the time delays caused by the delay circuit and the test specimen, and means coupled to the output of the signal generator for disabling the pulse signal generator after each output signal is produced for a period of time which is slightly less than the time delay of the delay circuit to prevent spurious operation of the signal generating means.

10. Measurement apparatus comprising a signal generator for producing a pulse signal in response to an input signal, a test specimen coupled to the output of the signal generator, a video amplifier coupled to the output of the test specimen, a limiter coupled to the output of the video amplifier, a delay circuit coupled between the output of the limiter and the input of the signal generator to cause the signal generator to produce signals having a repetition frequency which is governed by the sum of the time delays caused by the delay circuit and the specimen, and means responsive to pulses generated by said signal generator for measuring the frequency of the signals produced by the signal generator.

11. The apparatus of claim 10 further including means coupled to the output of the video amplifier for measuring the amplitude of the pulse signals which are applied to the limiter.

12. The apparatus of claim 10 further including means coupled to the measurement apparatus for providing an audio signal having a frequency which is representative of the repetition frequency of the pulse signals produced by the signal generator.

13. Measurement apparatus comprising a pulse signal generator for producing a pulse signal in response to an input signal, a radio frequency signal generator coupled to the output of the pulse signal generator for producing a radio frequency pulse signal in response to each signal produced by the pulse signal generator, a test specimen coupled to the output of the radio frequency signal generator, and means including a delay circuit coupling the output of the test specimen to the input of the pulse signal generator for causing the pulse signal generator to produce pulse signals having a repetition frequency which is governed by the sum of the time-delays caused by the delay circuit and the test specimen.

14. Measurement apparatus comprising a pulse signal generator for producing a pulse signal in response to an input signal, a radio frequency signal generator coupled to the output of the pulse signal generator for producing a radio frequency pulse signal in response to each pulse produced by the pulse signal generator, a test specimen coupled to the output of the radio freqency signal generator, a video amplifier coupled to the output of the test specimen, a limiter coupled to the output of the video amplifier, a delay circuit coupled between the output of the limiter and the input of the signal generator to cause the pulse signal generator to produce signals having a repetition frequency which is governed by the sum of the time delays caused by the delay circuit and the specimen, and means responsive to pulses generated by the signal generator for measuring the repetition frequency of the signals produced by the pulse signal generator.

References Cited in the file of this patent

UNITED STATES PATENTS

| | | |
|---|---|---|
| 2,083,344 | Newhouse et al. | July 8, 1937 |
| 2,453,970 | Charrier | Nov. 16, 1948 |
| 2,542,983 | Beatty | Feb. 27, 1951 |
| 2,546,985 | Dodington | Apr. 3, 1951 |
| 2,617,984 | Coykendall | Nov. 11, 1952 |
| 2,639,425 | Russell et al. | May 19, 1953 |
| 2,651,753 | Buyer | Sept. 8, 1953 |
| 2,717,358 | Munster | Sept. 6, 1955 |
| 2,821,705 | Wachtell | Jan. 28, 1958 |